(12) United States Patent
Huang

(10) Patent No.: US 7,946,838 B2
(45) Date of Patent: May 24, 2011

(54) MOLD FOR FORMING OPTICAL LENS

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 220 days.

(21) Appl. No.: 12/235,975

(22) Filed: Sep. 23, 2008

(65) Prior Publication Data

US 2009/0169666 A1 Jul. 2, 2009

(30) Foreign Application Priority Data

Dec. 27, 2007 (CN) .......................... 2007 1 0203473

(51) Int. Cl.
B29D 11/00 (2006.01)
B29C 33/30 (2006.01)

(52) U.S. Cl. .................... 425/192 R; 425/577; 425/468; 425/808

(58) Field of Classification Search .............. 425/192 R, 425/193, 195, 577, 414, 466–468, 808, DIG. 10
See application file for complete search history.

(56) References Cited

U.S. PATENT DOCUMENTS

| | | | | |
|---|---|---|---|---|
| 2,233,057 A * | 2/1941 | Luce | ................................ | 65/305 |
| 2,424,235 A * | 7/1947 | Hoffer | ........................ | 249/53 R |
| 3,079,737 A * | 3/1963 | Kratt et al. | ..................... | 451/384 |
| 3,387,334 A * | 6/1968 | Belanger et al. | ............. | 425/112 |
| 3,577,594 A * | 5/1971 | Al-Roy | ........................ | 425/195 |
| 3,804,153 A * | 4/1974 | Tagnon | ........................ | 164/332 |
| 3,856,450 A * | 12/1974 | Britten | ........................... | 425/398 |
| 3,932,085 A * | 1/1976 | Horbach | ........................ | 425/186 |
| 4,531,702 A * | 7/1985 | Plummer | ........................ | 249/64 |
| 4,834,558 A * | 5/1989 | Morse | .............................. | 384/54 |
| 5,116,450 A * | 5/1992 | Spoo et al. | ..................... | 156/441 |
| 5,468,136 A * | 11/1995 | Arisato et al. | ............ | 425/192 R |
| 5,731,013 A * | 3/1998 | vanderSanden | .............. | 425/183 |
| 5,733,585 A * | 3/1998 | Vandewinckel et al. | .. | 425/192 R |
| 6,328,552 B1 * | 12/2001 | Hendrickson et al. | ........ | 425/188 |
| 7,131,625 B2 * | 11/2006 | Wieder | .......................... | 249/103 |
| 7,435,593 B2 * | 10/2008 | Park et al. | ..................... | 435/396 |
| 7,846,370 B2 * | 12/2010 | Yu | .................................. | 264/318 |
| 2002/0044983 A1 * | 4/2002 | Wieder | ........................ | 425/192 R |
| 2005/0175727 A1 * | 8/2005 | Yang | .............................. | 425/195 |
| 2006/0145369 A1 * | 7/2006 | Lawton et al. | ............... | 264/1.32 |
| 2006/0145372 A1 * | 7/2006 | Jones et al. | ................... | 264/1.32 |

(Continued)

FOREIGN PATENT DOCUMENTS

CN 101003158 A 7/2007

(Continued)

*Primary Examiner* — Joseph S Del Sole
*Assistant Examiner* — Dimple Bodawala
(74) *Attorney, Agent, or Firm* — Andrew C. Cheng

(57) ABSTRACT

A mold includes a plurality of inserts, a molding board, a base board, a plurality of fastening members, and a plurality of washers. The inserts each has a molding surface. The molding board includes a plurality of cavities for accommodating of the respective inserts. The base board for mounting the molding board thereto has a plurality of receiving holes. The fastening members are respectively received in the corresponding receiving holes for securing the corresponding inserts in the corresponding cavities of the molding board. The washers are sandwiched between the respective fastening members and an opposite ends of the inserts to the molding surfaces.

2 Claims, 3 Drawing Sheets

U.S. PATENT DOCUMENTS

| | | | |
|---|---|---|---|
| 2006/0169074 A1* | 8/2006 | Liu et al. | 74/89.23 |
| 2007/0190197 A1* | 8/2007 | Chiang | 425/182 |
| 2007/0190204 A1* | 8/2007 | Chiang | 425/577 |
| 2007/0212439 A1* | 9/2007 | Chiang | 425/468 |
| 2008/0274289 A1* | 11/2008 | Sakurai et al. | 427/327 |

FOREIGN PATENT DOCUMENTS

| | | | |
|---|---|---|---|
| JP | 61272120 A | * | 12/1986 |
| JP | 61272121 A | * | 12/1986 |
| WO | WO 2005123300 A1 | * | 12/2005 |

* cited by examiner

MOLD FOR FORMING OPTICAL LENS

BACKGROUND

1. Field of the Invention

The present disclosure generally relates to molds, and particularly to a mold having a plurality of inserts.

2. Description of Related Art

Commonly, a mold includes a base board and a molding board mounted to the base board. The molding board defines a plurality of molding holes for accommodating a plurality of inserts. The mold also includes a plurality of washers respectively disposed in the corresponding molding holes and abutting against the corresponding inserts to finely adjust positions of the corresponding inserts in the molding holes.

However, when any one of the inserts needs to be adjusted to an appropriate position, the molding board would be disassembled from the base board to replace or correct corresponding washer. Meanwhile, the washers corresponding to the other inserts are exposed outside, so that the positions of the other corresponding inserts may not be appropriate after the molding board is reassembled to the base board. Therefore, the molding board needs be repeatedly disassembled from the base board to adjust positions of the inserts.

Therefore, an improved mold is needed to address the aforementioned deficiencies and inadequacies.

SUMMARY

Accordingly, a mold is provided. The mold includes a plurality of inserts, a molding board, a base board, a plurality of fastening members, and a plurality of washers. The inserts each has a molding surface. The molding board includes a plurality of cavities for accommodating of the respective inserts. The base board for mounting the molding board thereto has a plurality of receiving holes. The fastening members are respectively received in the corresponding receiving holes for securing the corresponding inserts in the corresponding cavities of the molding board. The washers are sandwiched between the respective fastening members and an opposite ends of the inserts to the molding surfaces.

Other advantages and novel features of the present disclosure will become more apparent from the following detailed description of embodiment when taken in conjunction with the accompanying drawings, in which:

DETAILED DESCRIPTION OF THE EXEMPLARY EMBODIMENT

Figure 1:
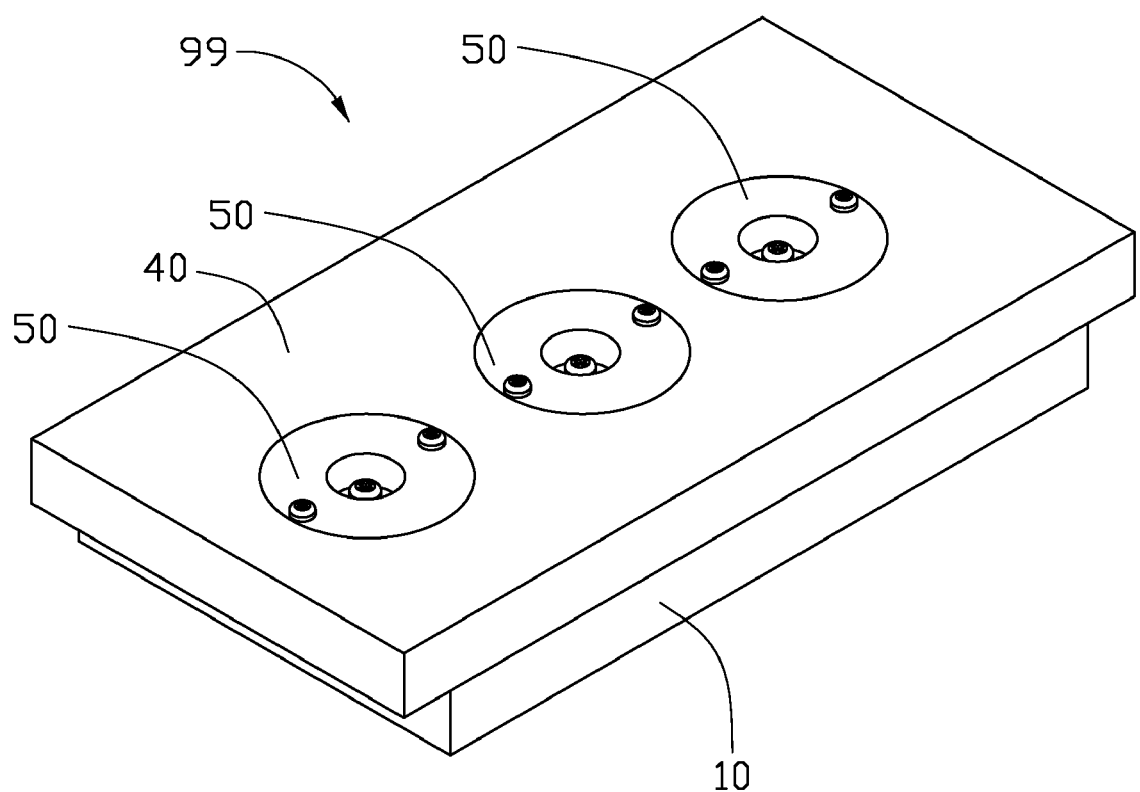
FIG. 1 is an isometric view showing a mold in accordance with an exemplary embodiment.
Figure 2:
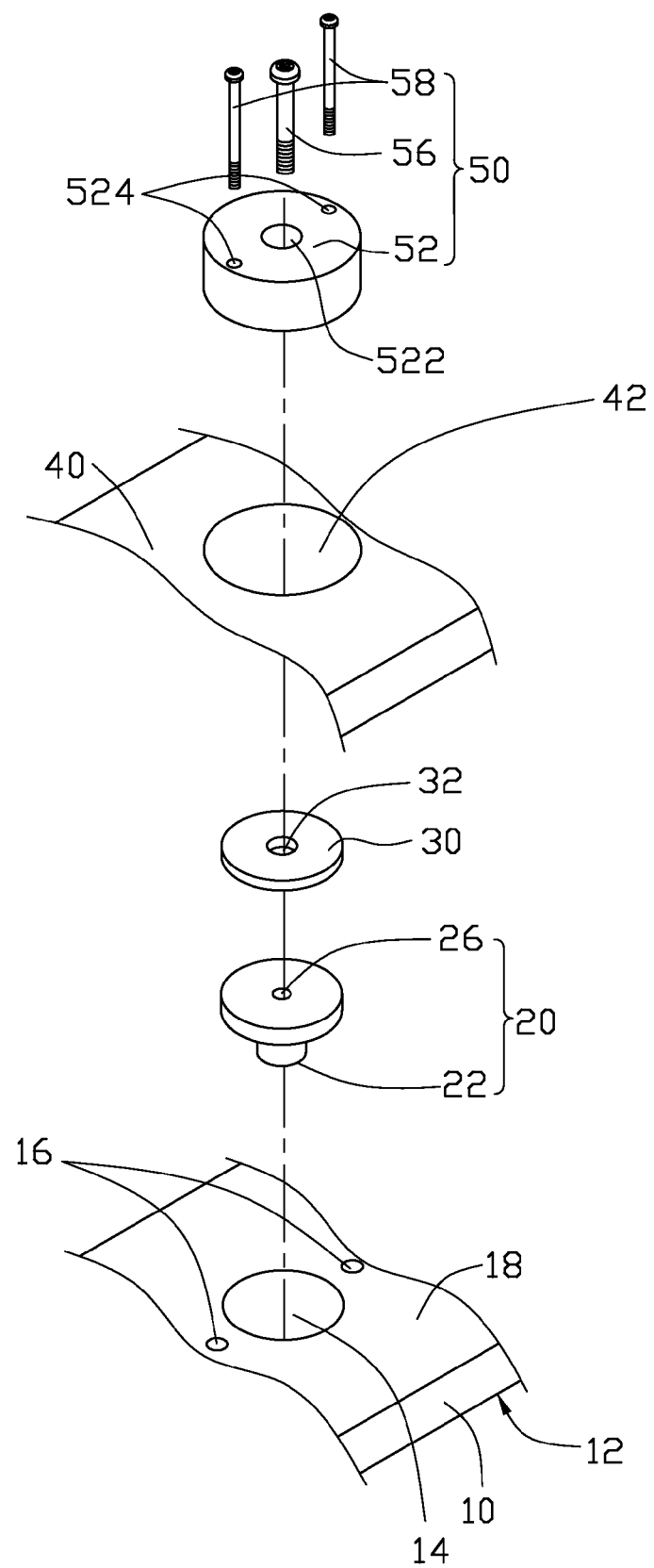
FIG. 2 is a partial exploded view of the mold in FIG. 1.
Figure 3:
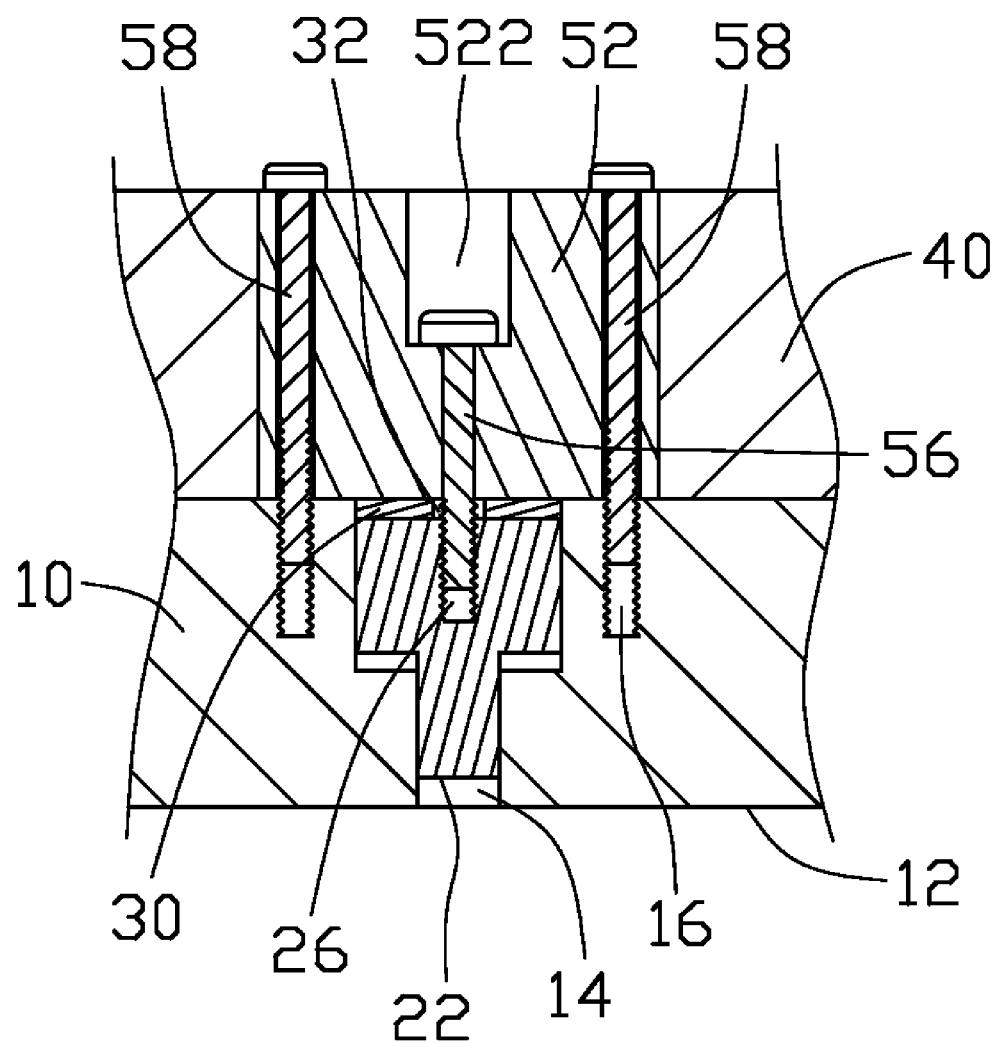
FIG. 3 is a partial cross-section view of the mold in FIG. 1.

Referring to FIGS. 1 to 3, a mold 99 includes a molding board 10, a plurality of inserts 20 for forming molding products, a plurality of washers 30, a base board 40, and a plurality of fastening members 50.

The molding board 10 has two opposite surfaces, e.g. a first surface 12 and a second surface 18. The first surface 12 may be used as a parting surface 12. A plurality of stepped cavities 14 are defined in the molding board 10 through the first and second surfaces 12, 18 for accommodating the corresponding inserts 20. The molding board 10 defines a plurality of pairs of first fixing holes 16 in the second surface 18. The first fixing holes 16 of each pair are substantially symmetrical about the corresponding cavity 14.

Each insert 20 has a molding surface 22 at one end and a second fixing hole 26 at the other end. The molding surfaces 22 are disposed adjacent to the first surface 12 for molding desired products.

Each washer 30 is disposed in the corresponding cavity 14 and placed on the corresponding insert 20. Each washer 30 defines a first mounting hole 32 in the central portion thereof.

The base board 40 is for mounting the molding board 10 thereto. The base board 40 defines a plurality of receiving holes 42 for allowing the corresponding washers 30 to pass therethrough.

The fastening members 50 are received in the corresponding receiving holes 42 for fastening the corresponding inserts 20 in the cavities 14 of the molding board 10. Each fastening member 50 has a main body 52, a first screw 56 and a pair of second screws 58.

Each main body 52 defines a second mounting hole 522 in the central portion thereof and a pair of third mounting holes 524. The two third mounting holes 524 of each pair are substantially symmetrical about the corresponding second mounting hole 522.

Each first screw 56 is capable of sequentially extending through the corresponding second mounting hole 522, the corresponding first mounting hole 32, and threading into the corresponding second fixing hole 26 to fix the corresponding insert 20, the corresponding washer 30 to the fastening member 50.

Each pair of second screws 58 is capable of extending through the corresponding pair of third mounting holes 524 and threading into the corresponding pair of first fixing holes 16 to secure the corresponding fastening member 50 to the molding board 10. Therefore, the corresponding inserts 20 are respectively fastened in the corresponding cavities 14 of molding board 10.

As described above, after the mold 99 is assembled, the fastening members 50 are respectively received in the corresponding receiving holes 42 of the base board 40 and fasten the corresponding inserts 20 in the corresponding cavities 14 of the molding board 10. When position of any one insert 20 is not appropriate, it only needs to disassemble the corresponding fastening member 50 from the molding board 10. Thus, the corresponding washer 30 can be replaced and reoriented. It does not need to disassemble the molding board 10 from the base board 40, such that positions of other inserts 20 are not influenced.

It is to be understood, however, that even though numerous information and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mold comprising:
    a plurality of inserts each having a molding surface;
    a molding board comprising a plurality of cavities for accommodating of the respective inserts;
    a base board for mounting the molding board thereto, the base board having a plurality of receiving holes;
    a plurality of fastening members respectively received in the corresponding receiving holes for securing the corresponding inserts in the corresponding cavities of the molding board, each fastening member comprising a unitary main body with a second mounting hole and a third mounting hole, a first screw and a second screw, each first screw being capable of sequentially extending through a corresponding second mounting hole, each second screw being capable of extending through a corresponding third mounting hole and engaging with the molding board to fix a corresponding fastening member to the molding board; and a plurality of washers sandwiched between the respective main body and opposite ends of the inserts to the molding surfaces by a screw, which engages with the insert to fix the insert to the corresponding fastening member.

2. A mold comprising:

a plurality of inserts each having a first end and an opposite second end, each insert having a molding surface at the first end;

a molding board comprising a plurality of through holes accommodating the respective inserts there, the molding board having a first surface and an opposing second surface, the molding surfaces of the inserts exposed at the first surface of the molding board;

a base board with the molding board mounted thereto, the base board having a plurality of receiving through holes;

a plurality of fastening members respectively received in the corresponding receiving through holes, the fastening members detachably secured to the second surface of the molding board, each fastening member comprising a unitary main body with a second mounting hole and a third mounting hole, a first screw and a second screw, each first screw being capable of sequentially extending through a corresponding second mounting hole, each second screw being capable of extending through a corresponding third mounting hole and engaging with the molding board to fix a corresponding fastening member to the molding board;

a plurality of washers sandwiched between the respective fastening members and the second ends of the inserts; and a plurality of screws extending through the respective fastening members and threadedly engaged with the opposite end of the inserts to the molding surfaces.

* * * * *